US012594885B2

(12) United States Patent
Lundy et al.

(10) Patent No.: US 12,594,885 B2
(45) Date of Patent: Apr. 7, 2026

(54) REARVIEW ASSEMBLY

(71) Applicant: GENTEX CORPORATION, Zeeland, MI (US)

(72) Inventors: Eric S. Lundy, Holland, MI (US); Joshua D. Lintz, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 768 days.

(21) Appl. No.: 17/447,487

(22) Filed: Sep. 13, 2021

(65) Prior Publication Data

US 2022/0080891 A1     Mar. 17, 2022

Related U.S. Application Data

(60) Provisional application No. 63/079,636, filed on Sep. 17, 2020.

(51) Int. Cl.
B60R 1/04          (2006.01)
B60R 1/08          (2006.01)
B60R 1/12          (2006.01)

(52) U.S. Cl.
CPC ................ B60R 1/04 (2013.01); B60R 1/088 (2013.01); B60R 1/12 (2013.01); *B60R 2001/1215* (2013.01); *B60R 2001/1253* (2013.01)

(58) Field of Classification Search
CPC .. B60R 1/04; B60R 1/08; B60R 1/088; B60R 1/12; B60R 2001/1215; B60R 2001/153

(Continued)

(56) References Cited

U.S. PATENT DOCUMENTS

| 5,572,354 A | 11/1996 | Desmond et al. |
| 6,195,194 B1 * | 2/2001 | Roberts ................. G02F 1/1533 |
| | | 362/135 |

(Continued)

FOREIGN PATENT DOCUMENTS

| CN | 109572581 A | 4/2019 |
| DE | 102017217811 B4 | 5/2019 |

(Continued)

OTHER PUBLICATIONS

International Search Report dated Nov. 25, 2021, for corresponding PCT application No. PCT/US2021/071434, 2 pages.

(Continued)

*Primary Examiner* — Thomas K Pham
*Assistant Examiner* — Justin W. Hustoft
(74) *Attorney, Agent, or Firm* — Price Heneveld LLP; Brian James Brewer

(57)          ABSTRACT

A rearview assembly having a transflective element, a carrier plate, and an imager. The transflective element may have a first side and a second side in a first direction relative the first side. The carrier plate has a third side and a fourth side. The third side is adhered to the second side and extends substantially there along. The carrier plate may also have a cavity extending from the third side in the first direction. The cavity may have a first aperture, a second aperture, and an end portion. The first aperture may be at the third side. The second aperture may be disposed in the first direction relative the first aperture. The end portion may circumscribe the second aperture. The imager may extend through the second aperture and comprise a light collection portion, which is disposed proximate the second side.

16 Claims, 4 Drawing Sheets

(58) Field of Classification Search
USPC .......................................................... 359/602
See application file for complete search history.

(56) References Cited

U.S. PATENT DOCUMENTS

| | | | |
|---|---|---|---|
| 6,961,195 | B2 | 11/2005 | Inagaki |
| 8,702,254 | B1 | 4/2014 | Englander et al. |
| 10,212,317 | B2 | 2/2019 | Sato |
| 10,279,744 | B2 * | 5/2019 | Hirano ................. A61B 5/6893 |
| 2003/0016125 | A1 | 1/2003 | Lang et al. |
| 2003/0227699 | A1 | 12/2003 | Inagaki |
| 2004/0008410 | A1 * | 1/2004 | Stam ........................ G02B 1/11 |
| | | | 359/443 |
| 2006/0203323 | A1 | 9/2006 | Tonar et al. |
| 2009/0015736 | A1 * | 1/2009 | Weller ...................... B60R 1/10 |
| | | | 362/494 |

FOREIGN PATENT DOCUMENTS

| | | | |
|---|---|---|---|
| EP | 0705734 | A1 | 4/1996 |
| JP | S59-029541 | A | 2/1984 |
| JP | H06-012199 | U | 2/1994 |
| JP | H07047880 | A | 2/1995 |
| JP | 2004010009 | A | 1/2004 |
| JP | 2007022495 | A | 2/2007 |
| JP | 2008018870 | A | 1/2008 |

OTHER PUBLICATIONS

Written Opinion dated Nov. 25, 2021, for corresponding PCT application No. PCT/US2021/071434, 5 pages.

* cited by examiner

REARVIEW ASSEMBLY

CROSS-REFERENCE TO RELATED APPLICATIONS

This application claims priority under 35 U.S.C. § 119(e) to U.S. Provisional Application No. 63/079,636 filed on Sep. 17, 2020, entitled "REARVIEW ASSEMBLY," the disclosure of which is hereby incorporated by reference in its entirety.

FIELD OF INVENTION

The present disclosure relates in general to rearview assemblies and, more particularly, to rearview assemblies having an imager behind a reflective element.

BACKGROUND OF INVENTION

Cameras are incorporated into vehicles with increasing regularity. In some instances, cameras are further incorporated into rearview assemblies. Specifically, the cameras may be positioned behind a transflective element of these rearview assemblies, in order to reduce their visibility to a user. However, cameras positioned behind surfaces may experience undesirable artifacts presented in their images. Light that is off-axis with the camera lens may transmit through the transflective element and reflect off various surfaces before collection by the camera lens. This problem is particularly prevalent with wide-angle camera lenses as, due to their wide filed of view, they may collect additional reflections that may otherwise not have been collected by other lenses. However, wide angle camera lenses also provide wider fields of view that may be beneficial or required in some applications, such as cabin monitoring. Accordingly, there is a need for an improved rearview assembly with a camera positioned behind a transflective element.

SUMMARY

In accordance with the present disclosure, the disadvantages and problems associated with undesirable artifacts as a result of positioning an imager behind a transflective element have been substantially reduced or eliminated.

In accordance with one aspect of the present disclosure, a rearview assembly is disclosed. The rearview assembly may comprise a transflective element, a carrier plate, and an imager. The transflective element may have a first side and a second side. The second side may be disposed in a first direction relative the first side. The transflective element may be variably reflective. In some embodiments, the transflective element may comprise a first substrate, a second substrate, a first electrode, a second electrode, and an electro-optic medium. The first substrate may have a first surface and a second surface. The second substrate may be substantially parallel the first substate and have a third surface and a fourth surface. The first electrode may be associated with the second surface. The second electrode may be associated with the third surface. The electro-optic medium may be disposed between the first and second electrodes. The carrier plate may, similarly, have a third side and a fourth side. The carrier plate may be disposed in the first direction relative the transflective element. The third side may be adhered to the second side and extend substantially there along. The carrier play may also form a cavity. The cavity may extend in the first direction from the third side and have a first aperture, a second aperture, and an end portion. In some embodiments, the cavity may be substantially cylindrical. Further, surfaces defined by the cavity may be anti-reflective. The first aperture may be at the third side. The second aperture may be disposed in the first direction relative the first aperture. Additionally, the second aperture may be smaller than the first aperture. The end portion may circumscribe the second aperture. The cavity may further have side walls extending between the third aperture and the end portion. Further, these side walls may be substantially perpendicular relative the third side. The imager may be operable to capture light and produce an image. Further, the imager may extend through the second aperture and comprise a light collecting portion disposed proximate the second side. In some embodiments, the light collecting portion may be disposed less than 5 mm or less than 1 mm from the second side. Additionally, the imager may substantially fill the second aperture.

In some embodiments, the carrier plate may also have a lip portion. The lip portion may circumscribe the first aperture and comprise an interior edge, an exterior edge, and a connecting surface. The interior edge may be in abutting contact with the second side. Further, the interior edge may define the first aperture. The exterior edge may circumscribe the interior edge. The connecting surface may extend between the interior edge and the exterior edge. The connecting surface may be sloped relative the third side. The lip portion may be raised in a second direction relative the third side. The second direction may be opposite the first direction.

In some embodiments, the carrier plate may be adhered to the second side via an adhesive foam layer. Additionally, in some further embodiments, the carrier plate does not make direct contact with the transflective element except via the lip portion.

In accordance with another aspect of the present disclosure, a carrier plate is disclosed. The carrier plate may comprise an elongate member and a cavity. The elongate member may have a first side and a second side. The second side may be disposed in the first direction relative the first side. The cavity may extend in the first direction from the first side. Additionally, the cavity may have a first aperture, a second aperture, and an end portion. The first aperture may be at the first side. The second aperture may be disposed in the first direction relative the first aperture. The end portion may circumscribe the second aperture. Additionally, the elongate member may be operable to support a transflective element of a rearview assembly. Further, the second aperture may be operable to accept a light collecting portion of an imager such that the imager may capture images through the transflective element.

In some embodiments, the elongate member may further comprise a lip portion. The lip portion may circumscribe the first aperture. Additionally, the lip portion may extend in a second direction relative the first side. The second direction may be defined as a direction opposite the first direction. In some such embodiments, the lip portion comprises an interior edge defining the first aperture. In such an embodiment, the cavity may additionally comprise side walls extending between the first aperture and the end portion.

The advantages of certain aspects of the present disclosure include reducing or eliminating undesirable artifacts in imaging. Light that is off-axis with the light collecting portion of the imager may have less reflections gathered by the light collecting portion of the imager than in prior rearview assemblies with an imager positioned behind a transflective element. Specifically, off-axis light may travel deeper into the cavity than the light collecting portion.

Additionally, light that impinges a side wall may be reflected even deeper into the cavity. Further, light may be substantially absorbed by the anti-reflective surface treatment. Accordingly, by reflecting light away from the light collecting portion as well as absorbing the off-axis light, the cavity may substantially reduce the amount of off-axis light that is captured by the imager. Therefore, artifacts present in images produced by the imager may be substantially reduced or eliminated. Further, embodiments having the lip portion may have the additional advantage of eliminating light reflections from the adhesive foam layer. These advantages may be particularly advantageous for embodiments where the imager has a wide field of view.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

DETAILED DESCRIPTION

Figure 1:
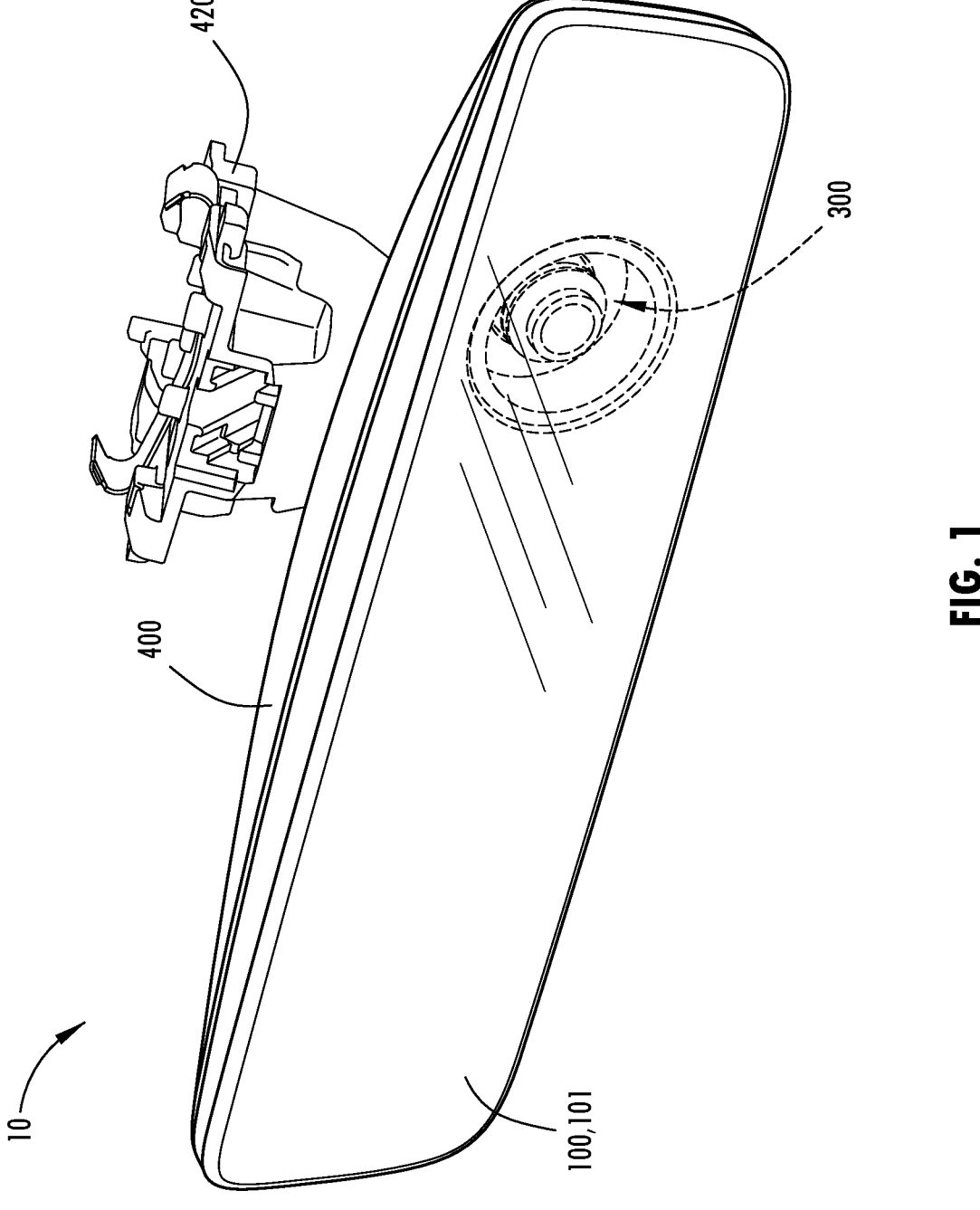
FIG. 1: Forward perspective view of an embodiment of a rearview assembly.
Figures 2A, 2B:
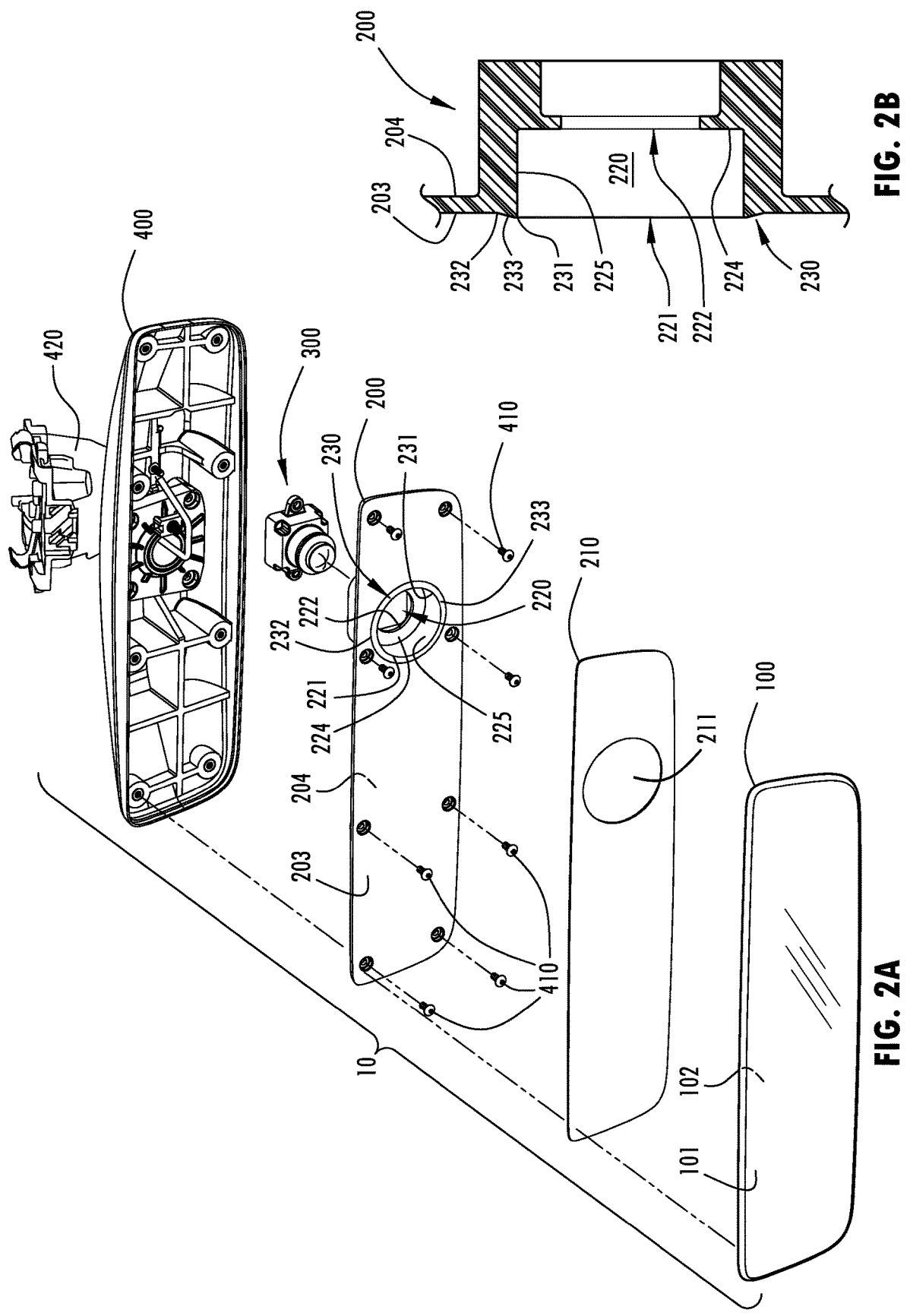
FIG. 2A: Exploded forward perspective view of an embodiment of a rearview assembly.
FIG. 2B: Cross-sectional view of an embodiment of a cavity of a carrier plate for a rearview assembly.
Figures 3A, 3B:
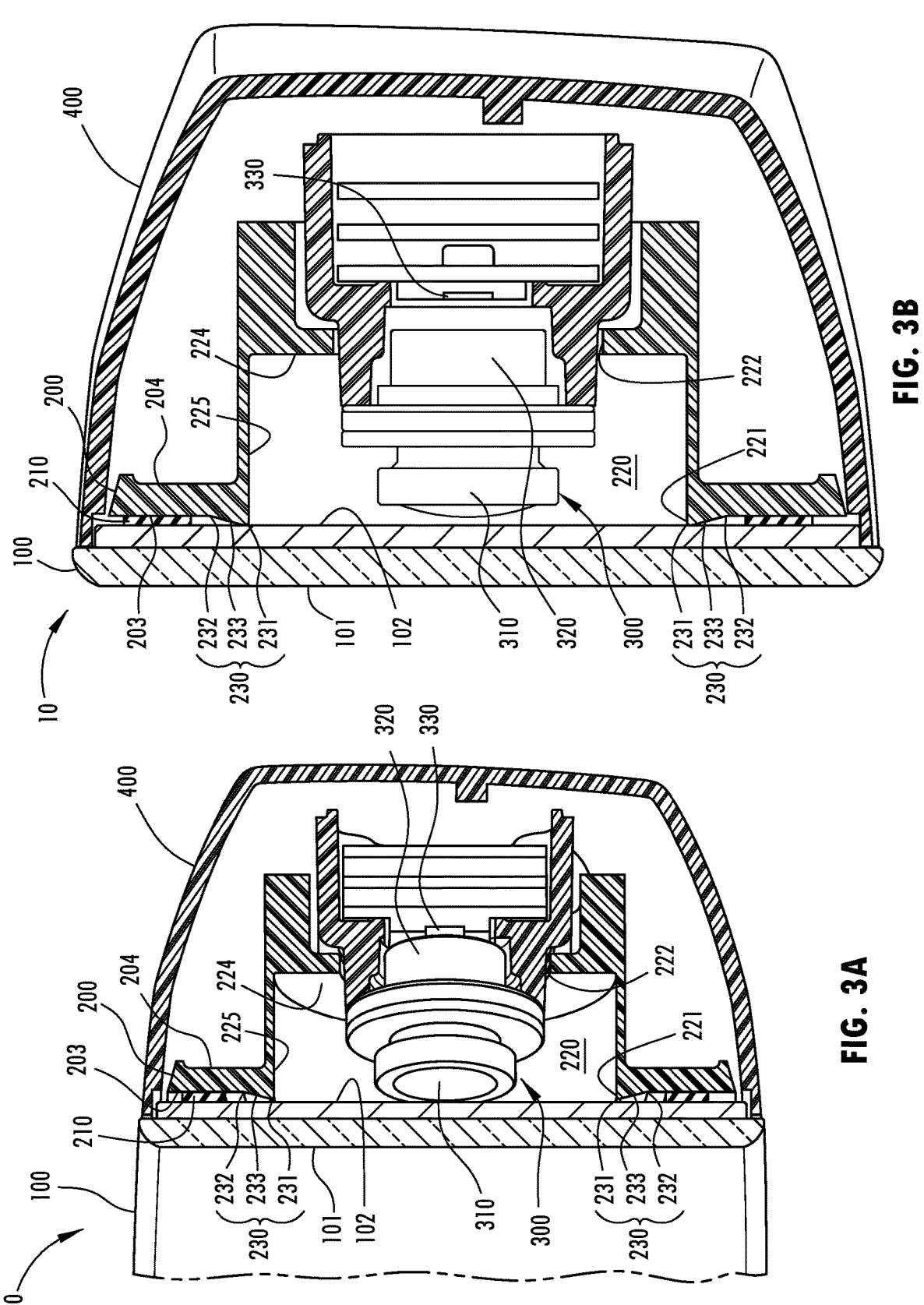
FIG. 3A: Forward sectional perspective view of an embodiment of a rearview assembly.
FIG. 3B: Cross-sectional view of an embodiment of a rearview assembly.

For the purposes of description herein, the specific devices and processes illustrated in the attached drawings and described in this disclosure are simply exemplary embodiments of the inventive concepts defined in the appended claims. Hence, specific characteristics relating the embodiments disclosed herein are not limiting, unless the claims expressly state otherwise.

FIGS. 1-4 illustrate schematic representations of a rearview assembly 10. Rearview assembly 10 may comprise, a transflective element 100, a carrier plate 200, an imager 300, and/or a housing 400. Further, rearview assembly 10 may be an interior rearview assembly or an exterior rearview assembly for a vehicle. Accordingly, rearview assembly 10 may be operable to provide a driver with a view rearward relative the vehicle to which it is associated.

Figure 4:
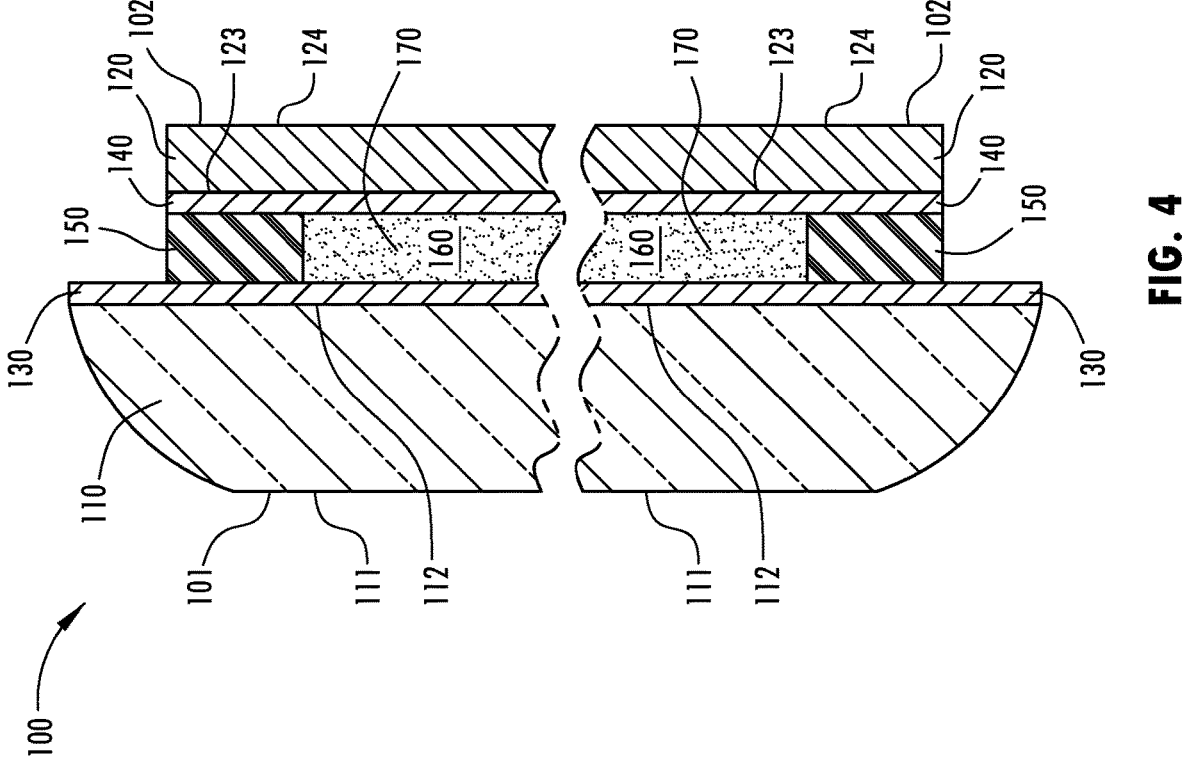
FIG. 4: Cross-sectional view of an embodiment of an electro-optic transflective element.

Transflective element 100 has a first side 101 and a second side 102. First side 101 may be directed toward the driver. Second side 102 may be opposite first side 101. Thus, second side 102 may be disposed in a first direction relative first side 101. The first direction may be defined as a direction substantially perpendicular to a planar extent of first side 101. Further, transflective element 100 may substantially reflect light impinging first side 101 while simultaneously substantially transmitting light therethrough. In other words, transflective element 100 may transmit light in the first direction while simultaneously reflecting light to a second direction opposite the first direction. In some embodiments, transflective element 100 may have a variable reflectance. In such an embodiment, transflective element 100 may be electro-optic (as shown in FIG. 4). Accordingly, transflective element 100 may comprise a first substrate 110, a second substrate 120, a first electrode 130, a second electrode 140, a seal 150, a chamber 160, and/or an electro-optic medium 170.

First substrate 110 comprises a first surface 111 and a second surface 112. Second surface 112 may be disposed in the first direction relative first surface 111. In some embodiments, first surface 111 may correspond to first side 101. Further, first substrate 110, may be fabricated from any of a number of materials that are transparent or substantially transparent in the visible region of the electromagnetic spectrum, such as borosilicate glass, soda lime glass, float glass, natural and synthetic polymeric resins, plastics, and/or composites. Substrate materials may be selected from any number of materials so long as the materials are substantially transparent and exhibit appropriate physical properties such as strength and tolerance to conditions of its environment, such as ultra-violet light exposure from the sun and temperature extremes.

Second substrate 120 is disposed in a substantially parallel, spaced apart relationship relative first substrate 110. Further, second substrate 120 comprises a third surface 123 and a fourth surface 124. Fourth surface 124 may be disposed in the first direction relative third surface 123. In some embodiments, fourth surface 124 may correspond to second side 102. Additionally, second substrate 110 may be fabricated from the same or similar materials as that of first substrate 110.

First electrode 130 is an electrically conductive material associated with second surface 112. The electrically conductive material of first electrode 130 may be substantially transparent in the visible region of the electromagnetic spectrum and generally resistant to corrosion from materials contained within the electro-optic element. The electrically conductive material may be a transparent conductive oxide (TCO), such as fluorine doped tin oxide (FTO), indium-doped oxide, doped zinc oxide, or other materials known in the art.

Similarly, second electrode 140 is an is an electrically conductive material associated with third surface 123. Second electrode 140 may likewise be substantially transparent. Accordingly, the electrically conductive material of second electrode 140 may be fabricated from the same or similar materials as that of first electrode 130. In some embodiments, second electrode 130 may also be substantially reflective or comprise a substantially reflective layer. Accordingly, second electrode 130 may be transflective. In other embodiments, a reflector may be associated with second electrode 140 between electro-optic medium 170 and second electrode 140, with third surface 123 between second electrode 140 and second substrate 120, or with fourth surface 124 of second substrate 120. Typical reflective materials include chromium, rhodium, ruthenium, silver, aluminum, gold, platinum, palladium, nickel, molybdenum, and combinations thereof.

Seal 150 may be disposed in a peripheral manner to define chamber 160 between first substrate 110 and second substrate 120. Chamber 160 may be defined by seal 150 in conjunction with at least two of: first substrate 110, second substrate 120, first electrode 130, and second electrode 140. In some embodiments, chamber 160 may, more specifically, be defined by seal 150, first electrode 130, and second electrode 140. Seal 150 may comprise any material capable of being adhesively bonded to the at least two of: first substrate 110, second substrate 120, first electrode 130, and second electrode 140, to in turn seal chamber 160 such that electro-optic medium 170 does not inadvertently leak out.

Electro-optic medium 170 is disposed in chamber 160. Additionally, electro-optic medium 170 is electro-active. Therefore, electro-optic medium 170 is operable between activated and un-activated states in response to an electrical potential. Accordingly, electro-optic medium 170 may include, among other materials, electro-active anodic and cathodic materials. In some embodiments, the anodic and/or cathodic materials may be electrochromic. In other words, the electro-optic medium 170 may be electrochromic. Electrochromic means that upon activation, due to the application of an electronic voltage or potential, the electrochromic item may exhibit a change in absorbance at one or more wavelengths of the electromagnetic spectrum. Accordingly, the electro-optic medium 170 may be variably transmissive. The change in absorbance may be in the visible, ultra-violet, infra-red, and/or near infra-red regions. In other embodiments, electro-optic medium 170 may be a liquid crystal medium or a suspended particle medium. Electro-optic medium 170 may be fabricated from any one of a number of materials, including, for example, those disclosed in U.S. Pat. No. 6,433,914, entitled "Color-Stabilized Electrochromic Devices," which is herein incorporated by reference in its entirety.

Carrier plate 200 is an elongate member disposed in the first direction relative transflective element 100. Further, carrier plate 200 comprises a third side 203 and a fourth side 204. Fourth side 204 may be disposed in the first direction relative third side 203. Additionally, Carrier plate 200 may substantially extend along second side 102 and be configured to support transflective element 100. In some embodiments, carrier plate 200 may be in abutting contact with and/or adhered to second side 102. In some such embodiments, carrier plate 200 may be adhered to second side 102 via an adhesive foam layer 210. Further, carrier plate 200 may have a polymeric and/or foam construction. Additionally, carrier plate 200 may form a cavity 220.

Cavity 220 may be a concave portion formed by a recess extending in the first direction from third side 203. Further, cavity 220 may be substantially formed in a variety of shapes. For example, cavity 220 may be substantially cylindrical, elliptic-cylindrical, conical, frustum-like, pyramidal, cubic, cuboid-like, hexagonal prismatic, or octagonal prismatic. In some embodiments, surfaces of cavity 220 may be surface treated with an anti-reflectant to reduce or minimize reflections off the surfaces of cavity 220. Additionally, cavity 200 may comprise a first aperture 221 and a second aperture 222. First aperture 221 may be substantially along or at third side 203. Second aperture 222 may be disposed in the first direction relative first aperture 221 and/or may be disposed substantially along or at fourth side 204. The first and second apertures 221, 222 may be a formed in a variety of shapes and, in some embodiments, may be formed from the same or different shapes. For example, the first and second apertures may be circular, elliptical, triangular, square, rectangular, hexagonal, or octagonal. In some embodiments, second aperture 222 may be smaller than first aperture 221. Accordingly, second aperture 222 may have a width less than a width of first aperture 221. Cavity 220 may also compromise an end portion 224 circumscribing second aperture 222. End portion 224 may be substantially parallel to and disposed in the first direction relative third side 203. Additionally, in some embodiments, side walls 225 defined by cavity 220 may be substantially perpendicular to second side 102, third side 203, end portion 224, first aperture 221, and/or second aperture 222. Further, side walls 225 may be substantially aligned with first aperture 221. Thus, side walls 225 may extend between first aperture 221 and end portion 224.

In some embodiments, carrier plate 200 may further comprise a lip portion 230. Lip portion 230 may circumscribe first aperture 221. Additionally, lip portion 230 may be raised and extend from third side 203 in the second direction. Lip portion 230 may comprise an interior edge 231, an exterior edge 232, and a connecting surface 233. Interior edge 231 may define first aperture 221. In some embodiments, interior edge 231 may make abutting contact with second side 102. Exterior edge 232 is larger than and circumscribes interior edge 231. In some embodiments, exterior edge 232 may be substantially planar with third side 203. In other embodiments, exterior edge 232 may be substantially planar with interior edge 231. Connecting surface 233 may be a surface extending between interior edge 231 and exterior edge 232. Accordingly, connecting surface 233 may be sloped relative third side 203. Further, connecting surface 233 may be a flat surface or a curved surface.

Additionally, in some embodiments, adhesive foam layer 210 may be substantially disposed between second side 102 and third side 203 such that carrier plate 200 does not make direct contact with transflective element 100 except via lip portion 230. Further, adhesive foam layer 210 may comprise an opening 211 substantially aligned with first aperture 221, lip portion 230, interior edge 231, and/or exterior edge 232, such that first aperture 221 is substantially un-occluded by adhesive foam layer 210.

Imager 300 may be any device operable to capture light and produce an image. The image may be a digital image. For example, imager 300 may be a camera. Imager 300 may be disposed, at least in part, within cavity 220. Further, imager 300 comprises a light collecting portion 310, a lens barrel 320, and a photosensitive array 330. Furthermore, imager 300 may be disposed such that light collecting portion 310 is disposed within cavity 220. Light collecting portion 310 may correspond to a front lens or an aperture. Additionally, light collecting portion 310 may be disposed proximate second side 102 and in or proximate first aperture 221. Light collecting portion 310 may, for example, be less than 5 mm, 4 mm, 3 mm, 2 mm, or 1 mm from second side 102. Lens barrel 320 may be deposed, at least in part, in cavity 220. Further, lens barrel 320 may extend through second aperture 222. Additionally, lens barrel 320 may substantially fill second aperture 222. Photosensitive array 330 may be disposed in the first direction relative second aperture 220. Accordingly, photosensitive array 330 may be a Semi-Conductor Charge-Coupled Device (CCD) or pixel sensor of Complementary Metal-Oxide-Semi-Conductor (CMOS) technology. In some embodiments, imager 300 may have a wide field of view. Accordingly, imager 300 may have wide angle lens.

Housing 400 may form a second cavity and have an opening. The opening may be disposed in the first direction of the second cavity. Transflective element 100 may be substantially disposed in or proximate the opening. Accordingly, carrier plate 200 and imager 300 may be disposed in the second cavity. In some embodiments, housing 400 may substantially abut second surface 112. Additionally, housing 400 may support carrier plate 200. Carrier plate 200 may be secured to housing 400 via a plurality of mechanical fasteners 410. Housing 400 may further comprise a mount 420. Mount 420 may operably secure housing 400 to a surface of the vehicle, such as a windshield, a headliner, or a body panel.

In operation, light may impinge transflective element 100 at first side 101. Some of the light may be reflected back therefrom. In embodiments where transflective element 100 is a variably transmissive electro-optic element, the first and second electrodes 130, 140 may apply an electrical potential to the electro-optic medium 170. The electro-optic medium 170 may accordingly be placed in an activated state and absorb a portion of the light, thereby dimming the reflectance. In addition to reflecting light back, some of the light may be transmitted therethrough. The transmitted light aligning with first aperture 221 may travel therethrough and be collected by imager 300. Accordingly, imager 300 may provide an image corresponding to a scene exterior and in the second direction relative rearview assembly 10.

Some embodiments of rearview assembly 10 may have the advantage of reducing or eliminating artifacts in imaging. Light that is off-axis with light collecting portion 310 of imager 300 may have less reflections gathered by light collecting portion 310 of imager 300 than in prior rearview assemblies with an imager positioned behind a transflective element. Specifically, off-axis light may travel deeper into cavity 220 than light collecting portion 310. Additionally, light that impinges a side wall 225 may be reflected back even deeper into cavity 220. Further, light may be substantially absorbed due to the anti-reflective surface treatment. Accordingly, by reflecting light away from light collecting portion 310 as well as absorbing the off-axis light, cavity 220 may substantially reduce or eliminate off-axis light captured by imager 300. Therefore, artifacts present in images produced by imager 300 may be substantially reduced or eliminated. Further, embodiments having lip portion 230 may have the additional advantage of eliminating light reflections from adhesive foam layer 210. These advantages may be particularly advantageous for embodiments where imager 300 has a wide field of view.

In this document, relational terms, such as "first," "second," and the like, are used solely to distinguish one entity or action from another entity or action, without necessarily requiring or implying any actual such relationship or order between such entities or actions.

For purposes of this disclosure, the term "associated" generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

The term "transflective" generally refers to an optical configuration that reflects at least a portion of light incident from at least one side and transmits at least a portion of light incident from at least one side. In particular, "transflective" describes an optical element or component that has a non-zero level of transmittance with regard to a wave range of light and also has a non-zero level of reflectance in a region. The applicable wave range of light will vary based on the context. However, in the event the relevant wave range of light is not readily apparent, the wave range in light shall generally refer to visible light.

The term "transparent" is applied in the relative sense. "Transparent" refers to an optical element or material that is substantially transmissive of at wavelengths in question and thus generally allows light at such wavelengths to pass therethrough. The wavelengths in question will vary based on the context. However, in the event the wavelengths in question is not readily apparent, the wavelengths in question shall generally refer to visible light.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A rearview assembly comprising:
a transflective element having a first side and a second side, the second side in a first direction relative the first side;
a carrier plate having a third side and a fourth side, the third side adhered to the second side, the carrier plate defining a cavity therethrough, wherein the cavity is cylindrical, the cavity having:
a first aperture at the third side adjacent the transflective element;
a second aperture disposed in the first direction relative the first aperture and having a smaller diameter than a diameter of the first aperture;
an imager receiving recess disposed in the first direction relative the second aperture and having a diameter that is smaller than the diameter of the first aperture; and
an end portion circumscribing the second aperture; and
an imager operable to capture light and produce an image, the imager extending through the second aperture and comprising a light collecting portion disposed proximate the second side.

2. The rearview assembly of claim 1, wherein the light collecting portion is disposed less than 5 mm from the second side.

3. The rearview assembly of claim 1, wherein the imager fills the second aperture.

4. The rearview assembly of claim 1, wherein the carrier plate further comprises a lip portion, the lip portion circumscribing the first aperture and comprising:

an interior edge, an exterior edge circumscribing the interior edge, and a connecting surface extending between the interior edge and the exterior edge.

5. The rearview assembly of claim 4, wherein the lip portion is raised in a second direction relative the third side, the second direction opposite the first direction.

6. The rearview assembly of claim 4, wherein the interior edge is in abutting contact with the second side.

7. The rearview assembly of claim 4, wherein the interior edge may define the first aperture.

8. The rearview assembly of claim 4, wherein the connecting surface is sloped relative the third side.

9. The rearview assembly of claim 1, wherein the cavity has side walls extending between the first aperture and the end portion.

10. The rearview assembly of claim 9, wherein the side walls are perpendicular relative the third side.

11. The rearview assembly of claim 1, wherein the first aperture is larger than the second aperture and the imager receiving recess.

12. The rearview assembly of claim 1, wherein surfaces of the cavity are anti-reflective.

13. The rearview assembly of claim 1, wherein the transflective element is variably reflective upon application of a voltage to the transflective element.

14. The rearview assembly of claim 2, wherein the transflective element comprises:

a first substrate having a first surface and a second surface;

a second substrate disposed substantially parallel the first substrate and having a third surface and a fourth surface;

a first electrode associated with the second surface;

a second electrode associated with the third surface; and an electro-optic medium disposed between the first and second electrodes.

15. The rearview assembly of claim 1, wherein the carrier plate is adhered to the second side via an adhesive foam layer.

16. The rearview assembly of claim 4, wherein:

the carrier plate is adhered to the second side via an adhesive foam layer; and the carrier plate does not make direct contact with the transflective element except via the lip portion.

\* \* \* \* \*